United States Patent
Tidwell

(10) Patent No.: US 6,956,582 B2
(45) Date of Patent: Oct. 18, 2005

(54) SYSTEM AND METHOD FOR AUTO-ADJUSTING IMAGE FILTERING

(75) Inventor: Reed P. Tidwell, Centerville, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 153 days.

(21) Appl. No.: 10/222,223

(22) Filed: Aug. 16, 2002

(65) Prior Publication Data

US 2003/0038818 A1 Feb. 27, 2003

Related U.S. Application Data

(60) Provisional application No. 60/314,425, filed on Aug. 23, 2001.

(51) Int. Cl.$^7$ .................................................. G09G 5/02
(52) U.S. Cl. ........................ 345/611; 345/428; 345/613; 345/617; 345/606; 345/586; 382/260; 382/265; 382/266; 382/274
(58) Field of Search ...................... 345/611–615, 418, 345/421–422, 428, 586–587, 589, 606, 501, 530, 545; 382/172, 260–265, 266–269, 274, 275, 279

(56) References Cited

U.S. PATENT DOCUMENTS

| | | | | |
|---|---|---|---|---|
| 6,084,610 A | * | 7/2000 | Ozaki et al. | 347/43 |
| 6,094,226 A | | 7/2000 | Ke et al. | |
| 6,424,343 B1 | * | 7/2002 | Deering et al. | 345/419 |
| 6,466,206 B1 | * | 10/2002 | Deering | 345/419 |
| 2002/0005862 A1 | * | 1/2002 | Deering | 345/694 |

* cited by examiner

Primary Examiner—Matthew C. Bella
Assistant Examiner—Wesner Sajous
(74) Attorney, Agent, or Firm—Thorpe North & Western LLP

(57) ABSTRACT

A method for is provided for antialiasing a computer graphics image using filtering. The method comprises the steps of defining a plurality of regions having samples from pixels in the computer graphics image, where the regions are associated with a pixel of interest and adjacent pixels to form an antialiasing filter. Another step is determining a contrast for each region. A further step is blending the regions that form the filter based on the contrast for each region.

30 Claims, 15 Drawing Sheets

| 0 | 0 | 0 | 0 | 0 | 0 |
|---|---|---|---|---|---|
| 0 | 1/4 | 1/2 | 1/4 | 0 | 0 |
| 0 | 1/4 | 1/2 | 1/2 | 1/4 | 0 |
| 0 | 1/4 | 1/2 | 3/4 | 1/2 | 0 |
| 0 | 1/2 | 1 | 1 | 3/4 | 1/4 |
| 0 | 1/2 | 3/4 | 3/4 | 3/4 | 1/4 |
| 0 | 1/2 | 1/2 | 1/4 | 1/4 | 0 |
| 0 | 1/4 | 1/4 | 0 | 0 | 0 |

FIG. 14

SYSTEM AND METHOD FOR AUTO-ADJUSTING IMAGE FILTERING

This application claims priority from U.S. Patent Application Ser. No. 60/314,425 filed on Aug. 23, 2001.

FIELD OF THE INVENTION

The present invention relates generally to digital image filtering.

BACKGROUND

Computer graphic images are often drawn on a raster-scan display and use a two dimensional array of pixels. These pixels are used to sample and render a geometric mathematical model, which represents a virtual world created by a computer graphics modeler. This quantization process often creates problems or anomalies in displaying the primitives or polygons that are processed. One problem is that visual artifacts are produced because the viewer's ability to resolve the image often exceeds the resolution of the display. For example, the image may be displayed at 1024×1280 pixels, which is a much lower resolution than the maximum resolution that the human eye is able to resolve.

The resulting visual problems are called aliasing, which includes undesirable results such as jagged edges, staircasing, flickering, scintillation and other problems. These aliasing effects are especially noticeable when a primitive object or polygon has a straight line or edge that does not align with the horizontal or vertical arrangement of the pixels. As can be imagined, objects in computer graphic images are not always aligned horizontally or vertically with the pixels. Techniques that reduce or eliminate these undesirable effects are referred to as antialiasing.

Of course, image quality is a somewhat subjective property that is heavily judged by the amount of detail in the scene, the presence or lack of artifacts, and similar factors. This is evidenced in the mainstream PC graphics card market by the ever-increasing drive to higher resolutions, more polygons, more lighting effects, and texture maps for increased detail. Off-the-shelf systems are also moving toward MIP-mapped texture and full-screen antialiasing to reduce image artifacts.

One method for reducing aliasing is called supersampling. This approach takes more than one sample for each pixel and combines the samples together to create the final pixel. Each sample or subpixel typically includes a color-value (or grey-scale value) and a Z-value. The depth value or Z-value represents the relative depth of a sample in the scene and it is used to perform hidden surface removal.

Antialiasing is generally implemented with sampling or subpixel buffers that include 2, 4, 8, 16 or more samples per pixel in the pixel resolution image. Each pixel has a corresponding number of samples, such as 16 samples for each pixel. These sampling buffers have often been implemented with dynamic random access memory (DRAM or SDRAM) or other more expensive types of high speed RAM.

Expensive ways of improving edge quality include simply taking more samples per pixel, or implementing an analytical pixel coverage algorithm using alpha. More samples per pixel require more hardware for equivalent performance as compared to a system with fewer samples per pixel. In addition, analytical pixel coverage requires depth sorting for primitives and does not handle interpenetration of primitives. Alpha based methods (i.e., edge antialiasing) are also generally considered incompatible with multi-sample, Z-buffered techniques or full-screen antialiasing.

One variation of the supersampling technique enables additional samples to be taken only for pixels that are intersected by edges. This technique can increase the image quality, however, the number and location of samples calculated are variable and may vary from frame to frame. The determination of the number and location of samples must be done as the pixels are rendered. Essentially, this increases the amount of hardware storage area, but not as dramatically as a system that uses a fixed number of samples.

Another tool that is used to overcome aliasing is performing filtering. For example, post filtering is the filtering of an image after point sampling when it is stored in the frame buffer. Filtering averages pixels together and reduces image contrast that can create aliasing. The most basic form of filtering is applying a flat top filter, one pixel in size, to the samples in each pixel. Higher quality antialiasing can be achieved using a filter kernel of greater than one pixel in size over the entire image. For example, a type of filtering known as "quincunx" has been used in Nvidia graphics chips. The quincunx method uses post filtering on a two sample per pixel sampling pattern. Specifically, 5 samples are filtered to get the value of each displayed pixel and 3 of the samples are derived from adjoining pixels.

Filter kernels approximating the sinc function (the ideal low pass filter), such as a 2×2 Gaussian filter have resulted in better edge quality. These larger post-filters result in the smoothing of edges and reduced artifacts. A side effect of a larger post filter is that some detail is lost across the whole image. This trade-off in loss of detail when using a fixed filter across the image has generally been tolerated because it helps reduce the aliasing.

Current filtering methods apply a filter with a fixed size and weighting uniformly across an entire graphic image. For example, a fixed filter can be applied as a post-filter or a texture filter. This results in a uniform reduction of artifacts such as stair-stepping, scintillation, and popping. However, it also results in a uniform reduction in detail and clarity in the image. This type of fixed filter is well known to those skilled in the art and straightforward to ensure that the filter meets the Erdahl criterion for energy contribution from each of the samples or pixels.

The Erdahl equal-energy criterion requires that each sample must make the same overall energy contribution to the picture no matter which filter kernel is applied to a given region. In other words, no picture information should be lost or discarded in filtering. For example, suppose that four samples are taken for a given pixel area, S1, S2, S3 and S4. If the filter uses only these 4 samples to calculate the pixel color and applies a weight of $3/6$ to S2 and $1/6$ to S1, S3, and S4, then there is information lost from S1, S3, and S4 relative to S2. The negative consequences of not obeying the Erdahl criterion are usually observed in objects in motion relative to the screen. FIG. 1 shows a circular object in relationship to a sample grid in which the samples are weighted in violation of the Erdahl criterion. The samples with the dark outline are weighted by $3/6$ and the others are weighted $1/6$. In this location, the object covers 11 samples with a total weight of $$1*(3/6)+10*(1/6)=2\ 1/6$$

FIG. 2 shows the same circular object which has moved to a slightly different location. It also covers 11 samples, but the sample weighting produces a total weight of $$3*(3/6)+8*(1/6)=2\ 5/6$$

Thus, the total weight of the object is not the same in the two locations because of the unbalanced weighting. The visual result is that the object would appear to "twinkle" as it moves across the screen.

If the weighting of each of the 4 samples were the same (¼) then the total weight in either the position of FIG. 1 or the position of FIG. 2 would be

11*(¼)=2¾.

SUMMARY

The invention provides a method for antialiasing a computer graphics image using filtering. The method comprises the steps of defining a plurality of regions having samples from pixels in the computer graphics image, where the regions are associated with a pixel of interest and adjacent pixels to form an antialiasing filter. Another step is determining a contrast for each region. A further step is blending the regions that form the filter based on the contrast for each region.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 14 illustrates an example of a region of a frame buffer on which the auto-adjusting filter is used;

DETAILED DESCRIPTION

Figure 1:
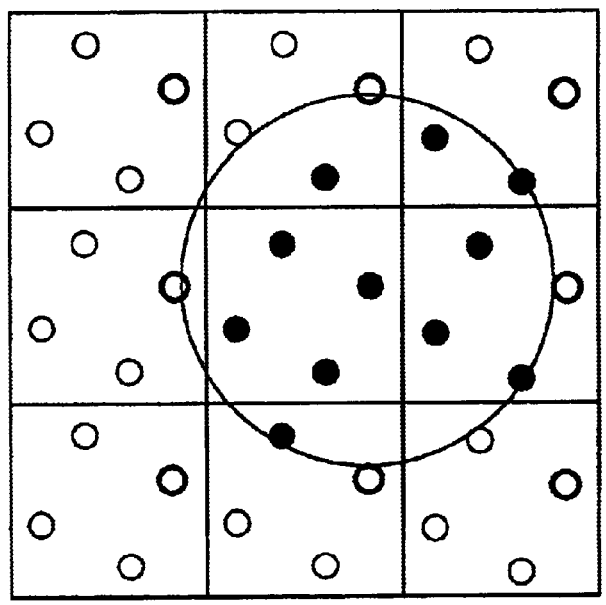
FIG. 1 illustrates a circular object in relationship to a sample grid in which the samples are weighted in violation of the Erdahl criterion.
Figure 2:
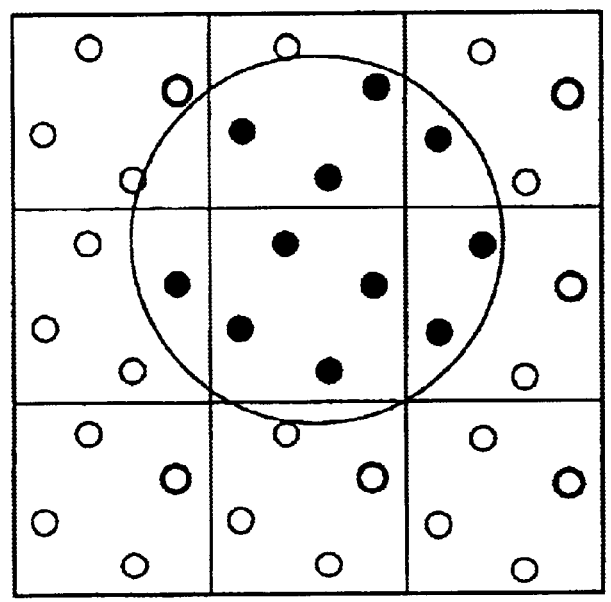
FIG. 2 illustrates the same circular object in FIG. 1 which has moved to a slightly different location.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A significant disadvantage to a fixed post-filter is that areas of texture, photographic detail, and other detail that are clear before the application of the filter will be blurred based on the size, shape, and weighting of the fixed filter. The traditional wisdom in the computer graphics industry has been that a graphics system can apply filtering or post-filtering when the final image or end users can tolerate the blurring or added haziness. Otherwise, filtering is turned off if it interferes with the final image too much. In some applications such as computer games, the blurring is less significant because the loss of some detail does not affect the playability of the game and the value of the anti-aliasing is positive.

Unfortunately, in high precision applications such as flight simulation or medical imaging the blurring is less tolerable. This is because the highest level of detail is desired to provide image cues for the user. For example, it is significant whether a pilot can see small objects in the distance or on the horizon. Another example would be in medical imaging where a doctor needs to see as much detail as possible and a filter might destroy some of that detail.

Furthermore, computer graphics experts have desired to use tried and true filters. This is because of the problems associated with filtering such as the requirement of meeting the Erdahl criterion and finding a low pass filter that does not decrease the detail too greatly. For example, the Gaussian filter models a low pass filter and it is efficient to apply to an image. Thus, it has been believed that such filters were sufficient filters and post filters.

The present invention will now be described and it provides a filtering method and system that overcomes the problems of the prior art by using an auto-adjusting filtering system and method. The filtering system analyzes regions of the original image to determine where artifacts may occur based on contrast. Then the system changes one or more filter kernel attributes and applies a larger more aggressive filter to the "problem areas". Two of the attributes of the filter that can be changed are size and shape. A minimal filter can also be applied to areas with a lower contrast, which helps preserve the detail of the overall image.

One embodiment of this invention uses a small area of contrast evaluation (e.g., a 1×1 pixel area) even though the effective filter kernel can be much larger (e.g., 2×2 pixels). As a result, at least two passes are generally used to increase the filter kernel size. In an embodiment that will be illustrated below, the filter size is increased by 4 times when using two passes. Additional passes using the same filter algorithm can be incorporated to further enlarge the filter kernel. For example, four passes can be made to create a 5×5 pixel kernel.

There are some fundamental insights behind the present method and system for automatically adjusting filtering. One insight is that visual artifacts generally result from high-contrast irregularities. Accordingly, the auto-adjusting filter identifies such areas and compensates for those irregularities. On the other hand, low contrast irregularities are harder to detect unless they are very large in area, in which case it is much more difficult for a filter to correct them unless a larger amount of computing power or time is used.

Another insight of the present system is that texture applied to primitives is already filtered to reduce aliasing artifacts. Texture filtering can be performed through the methods of clamping, bilinear blending, and tri-linear blending using MIP maps. Post-filtering textured polygons and primitives with a filter kernel of greater than 1 pixel has the effect of reducing or "washing out" texture detail, which is generally considered undesirable.

This filtering invention can also be applied to texture filtering or other types of image filtering that are used earlier in the graphics pipeline. Currently tri-linear and bi-linear filtering are used for texture filtering and this type of filtering can be modified by the contrast controlled auto-adjusting filter of the present invention. Alternatively, common texture filters now used can be replaced with the auto-adjusting filtering method.

In order to combat the "washing out" or blurring of image details, the present system and method can apply a wide filter in areas of high contrast irregularities. These areas of high contrast generally occur at polygon edges, light sources, and similar areas. This method can then apply a narrow filter to low contrast intensity and/or color variations, and these generally occur in the interior of textured polygons.

In an image, it is desirable to limit pixel-to-pixel contrast in order to minimize artifacts. Contrast can be based on ratios and is thus logarithmic in nature, as is the sensitivity of the eye to brightness. In practice, intensity (not the log of intensity) is used throughout the graphics pipeline and in the display devices.

A specific embodiment of the present invention improves antialiasing by employing a filter kernel based on contrast. This filter has a specific coverage area but continuously varying size, geometry, and weighting based upon the linear intensity differences or log of intensity differences between neighboring pixels. Further, the results from the filter weighting are normalized in order to meet the Erdahl criterion. This has the effect of limiting the pixel-to-pixel contrast.

Figure 3:
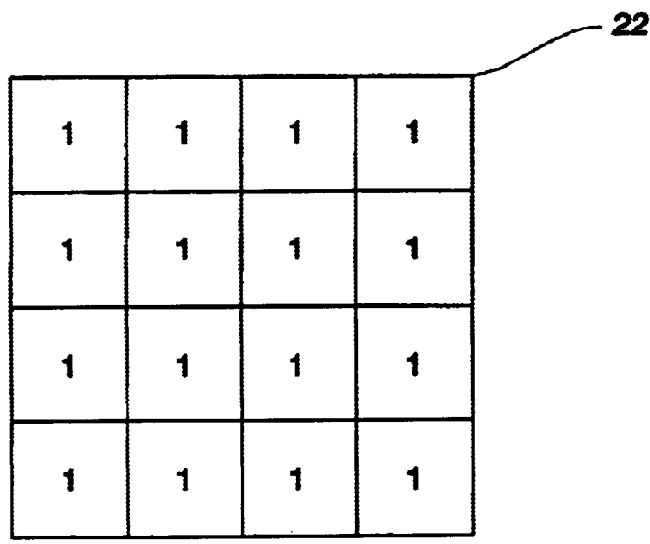
FIG. 3 illustrates a flat top 4×4 sample filter used to filter areas with a higher contrast.
Figure 4:
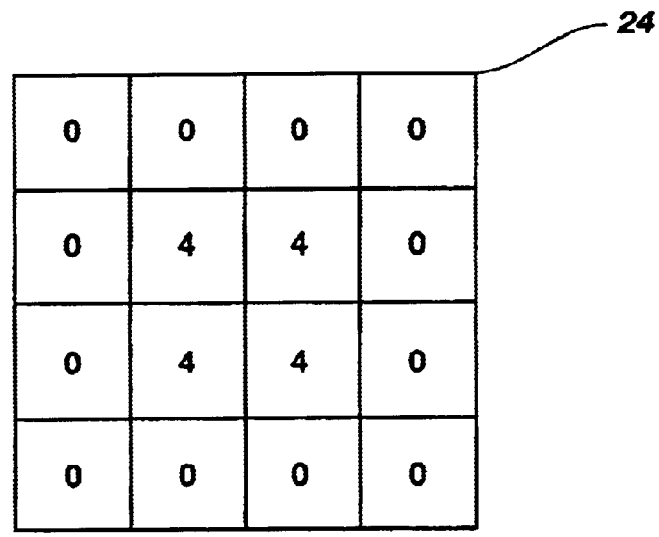
FIG. 4 illustrates a 2×2 sample narrow filter that can be used with areas of lower contrast.

When the present system is implemented with a 4×4 sample filter kernel, the weighting can vary relatively continuously. An aggressive filter that the system can apply is a flat wide filter 22, as exemplified in FIG. 3, for areas with a large contrast. This also provides good artifact reduction in high contrast areas. A minimal filter kernel can be applied in areas with comparatively low contrast. As illustrated in FIG. 4, a narrow tall filter 24 can be used for areas with minimal contrast (e.g., more solid areas). A minimal filter provides good detail preservation in these lower contrast areas.

In addition to the aggressive and minimal filter kernels, other kernel filters are also created to provide intermediate levels of filtering. Of course, an unlimited number of filter levels can be provided, but approximations for computational simplicity involve selecting one of a finite set of filter weighting arrangement based on contrast. A very simple approximation of the present invention uses two filter selections as shown in FIGS. 3 and 4. These filter selections are selected as compared to a programmable contrast threshold without regard to the direction of the intensity gradient.

Figure 5:
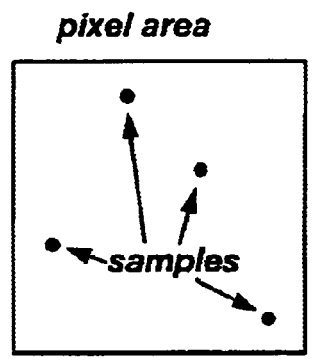
FIG. 5 is an example of a one possible sampling pattern in a pixel.

Some embodiments of this invention can include a graphics system incorporating full-screen antialiasing with 4-point samples per-pixel. A possible sampling pattern is shown in FIG. 5 and many other sampling configurations can be used, such as a 2 samples-per-pixel pattern. In a 4-point sampling system, the four samples of each pixel are averaged to obtain a final color for the pixel. This constitutes a 2-sample by 2-sample flat top filter.

A 4-sample by 4-sample filter or an area that is 4 times larger than a single pixel filter can be implemented by performing "four corners" filtering before the averaging of the 4 samples in a pixel. This filtering step consists of averaging the samples at the each corner region of a 2×2 array of pixels and replacing each of the samples with the average of the four corners samples as shown in FIG. 6.

Figure 6:
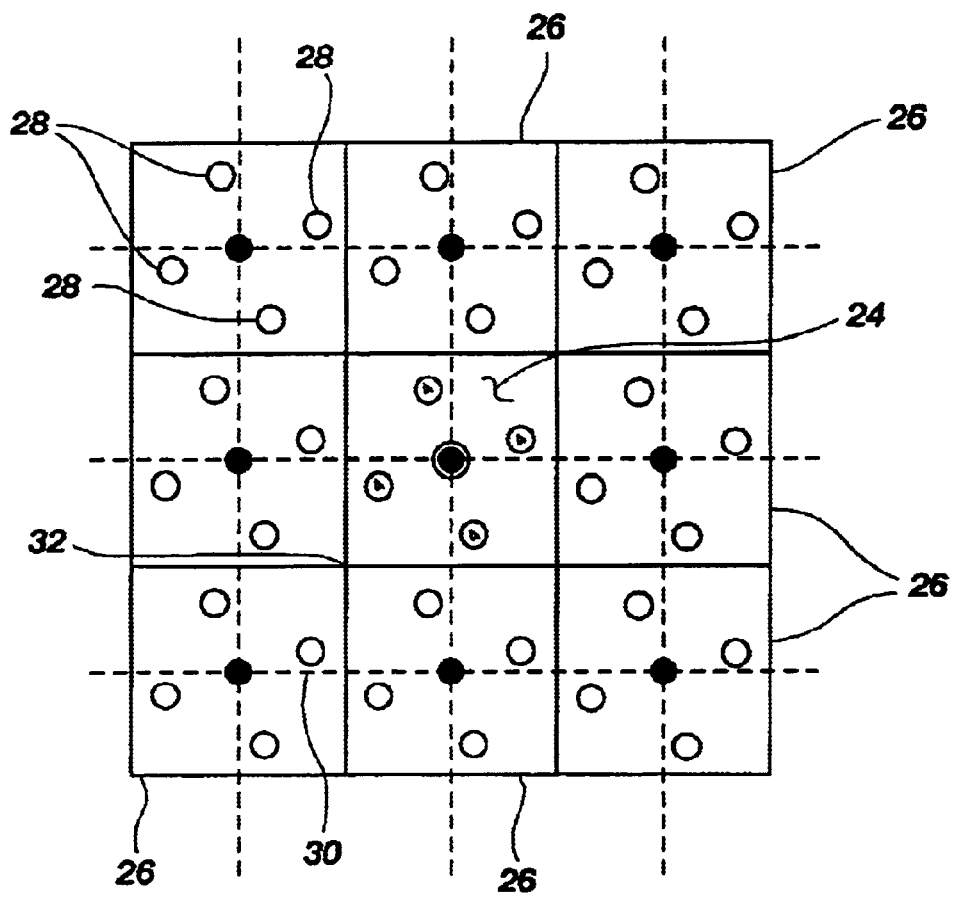
FIG. 6 depicts a 2×2 sample filter that results when all four corners regions are below a contrast threshold level.

The center pixel or pixel of interest 24 in FIG. 6 is illustrated using concentric circles. Surrounding the pixel of interest are adjacent pixels 26 which may contribute to the final color of the pixel of interest based on contrast. Each pixel contains four of its own samples 28 and then the samples from each of the pixels adjacent to the corner are grouped around a four corners region as depicted with dotted lines 30. Each four corners region is centered on a corner 32 of the pixel of interest and contains 4 samples and one sample (or more) comes from each of the pixels in the four corners region.

The four corners filtering step is performed only if a high contrast condition exists in the four corners region. If a high contrast condition is not present, then the four corners filtering step is not performed and the samples remain unchanged. The test for a high contrast condition and the subsequent application of the auto-adjusting filter or post filter may be performed independently for each of the red, green, and blue color components.

The determination of a high contrast condition is performed by comparing the component value or intensity of each of the four samples in the four corners region. A contrast ratio is established by dividing the greatest sample value by the smallest sample value in the region. Alternatively, a contrast index equal to a 1—1 contrast ratio can be calculated by dividing the greatest sample value by the difference between the greatest sample value and the smallest sample value. The contrast ratio can vary from 1 to infinity, whereas the contrast index is limited to a value from 0 to 1. This contrast value (ratio or index) is then compared against a pre-determined contrast threshold value. If the contrast value is above the pre-determined contrast threshold level, the filter for the region is applied. If the contrast value is not above the contrast threshold value, then the samples remain unchanged. After the auto-adjusting filter is applied to all samples in a pixel region, the averaging of the samples to get a final pixel color is performed. As mentioned, these steps are specifically useful when performed as part of the post filtering of a computer graphic image.

Another embodiment of the invention can use a brightness difference as a form of contrast comparison. Using the brightness difference between pixels is defined as subtracting a minimum sample brightness value from a maximum sample brightness value to obtain the brightness difference. The brightness difference value can then be used to control filtering.

Figure 7:
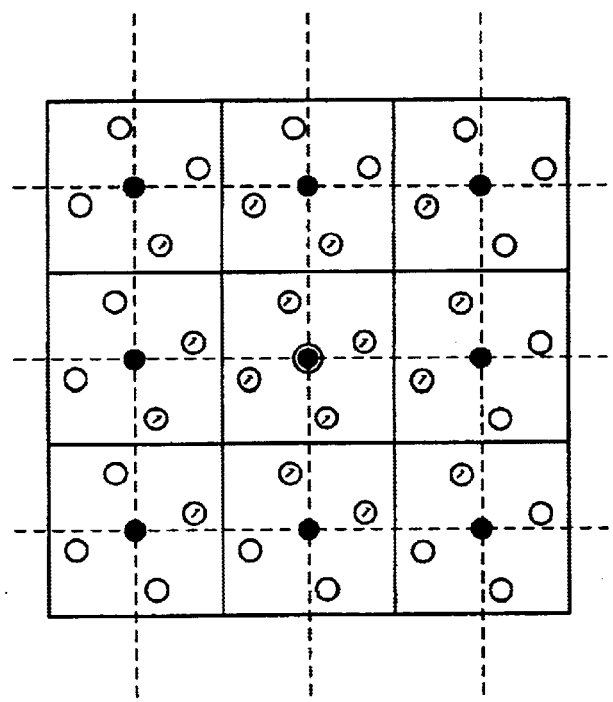
FIG. 7 illustrates a 4×4 sample filter that results when all four corners regions are above a contrast threshold level.

FIG. 7 illustrates a filter kernel that results when each four corners region has met or exceeded the pre-determined contrast threshold. In this situation, the samples from each of the four corners regions have been averaged and the samples have each been replaced with the average value for a region. Next, the 4 samples in the pixel of interest are averaged to provide the final color value for the pixel.

Figure 8:
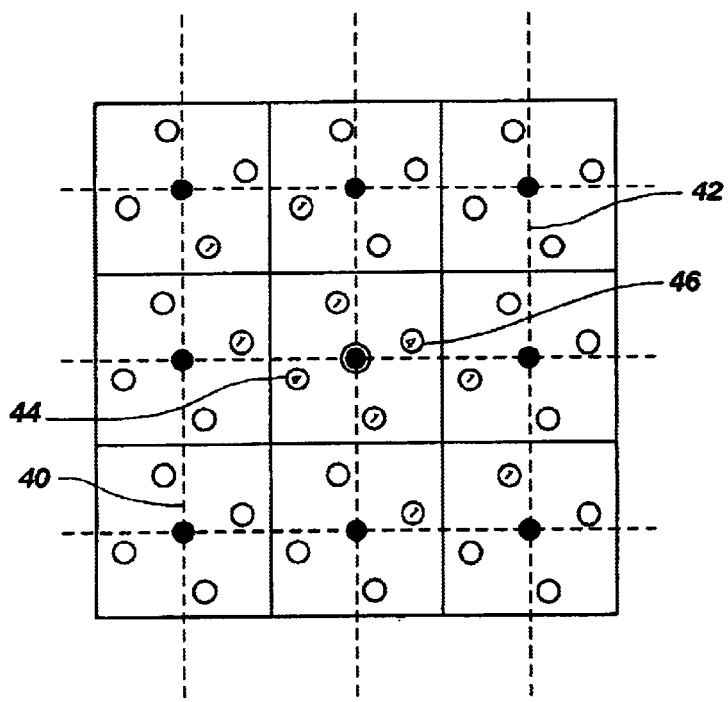
FIG. 8 illustrates a modified 4×4 sample filter that results when two of the four corner regions are above a contrast threshold level.

FIG. 8 depicts a filter kernel that is not filtering two of the four corners regions for the pixel of interest because they did not meet the pre-determined contrast threshold. The lower left corner 40 and the upper right corner 42 are not filtered in the four corners filtering step because the contrast in those corners does not exceed the pre-determined contrast threshold. Since these two corners were not filtered in the aggressive filtering step, the samples that will be used to create the final pixel color are incorporated with a 4 times weighting 44, 46. This insures that each sample adds an equal weighting to the pixel and follows the Erdahl criterion. Of course, the non-filtered samples can use a 1 times weighting but this does not necessarily guarantee that information will not be lost.

The evaluation and filtering can also be performed in several steps with pairs of samples rather than evaluating all four samples at once. Also, note that the explicit results of the evaluation do not have to be stored since the action taken because of the evaluation is performed immediately and the resulting sample values are stored in place of the original samples.

Figure 9:
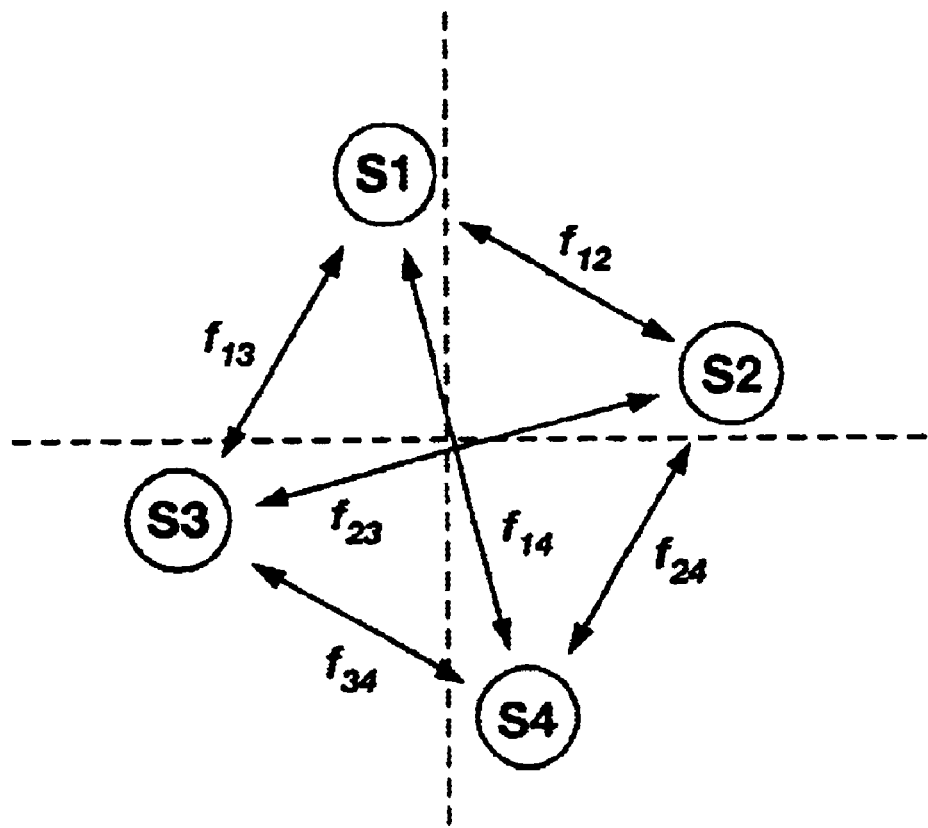
FIG. 9 illustrates 4 samples from neighboring pixels, labeled S1 to S4, representing a four-corners area.
Figure 10:
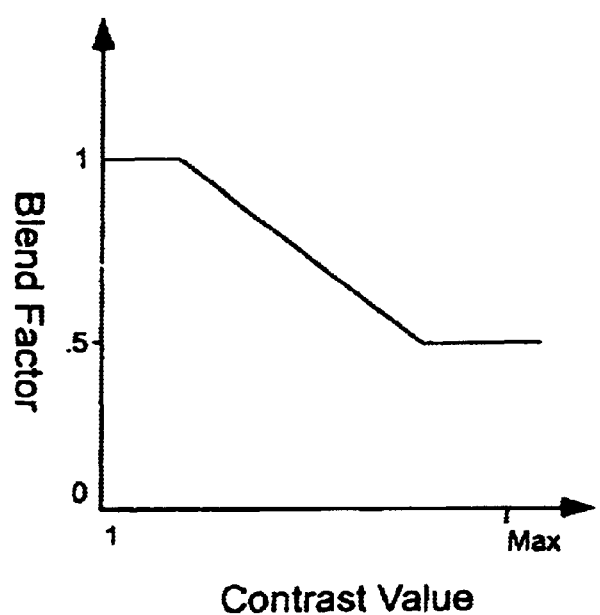
FIG. 10 illustrates a linear blend function.
Figure 11:
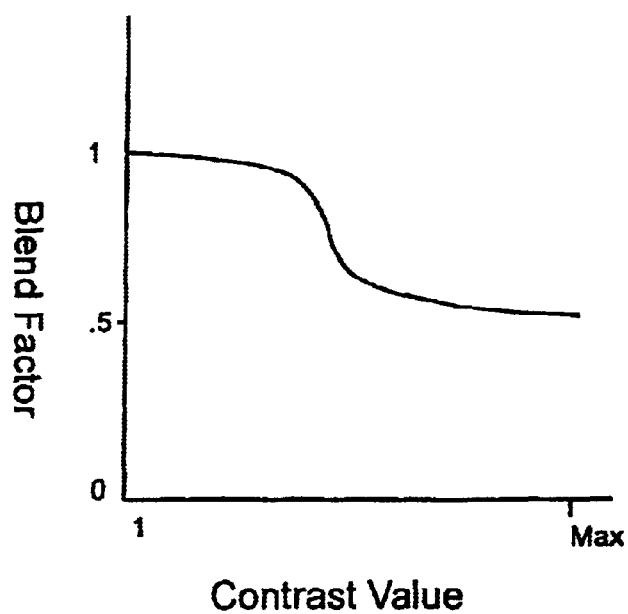
FIG. 11 illustrates a curved blend function.
Figure 12:
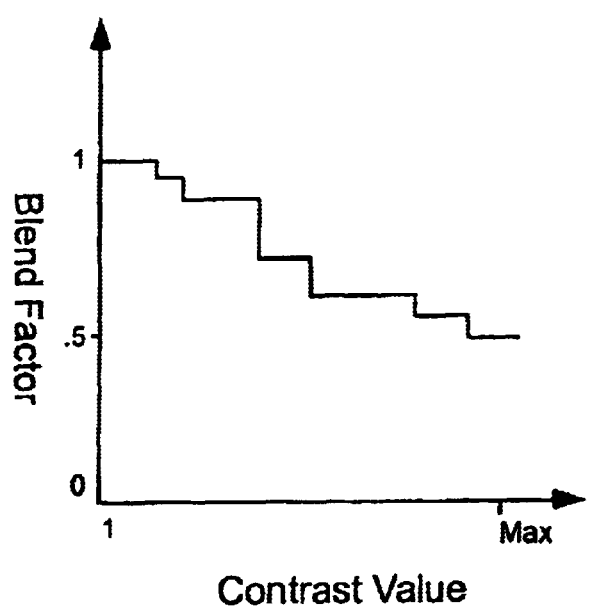
FIG. 12 illustrates a stepwise blend function.

The contrast ratios can be calculated in other ways too. It is be possible to calculate a ratio against some central reference point that is not one of the original samples. For example, FIG. 9 shows 4 samples from neighboring pixels, labeled S1 to S4, representing a four-corners area. Rather than blending all 4 values as a group, each sample is compared to every other sample and a blend factor $f_{xx}$ is chosen for each pair based on the contrast between the samples. The factor is a function of the contrast between the sample pair and can be between 0 and 1. A wide variety of functions may be used in the present invention, and different functions can be used to choose each factor in order to make the filter more aggressive in one direction than another. Some of the possible blend functions are shown in FIGS. 10–12. In general, the blend factor should be lower for sample pairs with high contrast and higher for sample pairs with low contrast. The arrows in FIG. 9 represent the 6 different comparisons that can be done between samples. The 6 factors are also shown. The final value of each sample is computed according to the following equations:

$$S1'=[f_{12}S1+(1-f_{12})S2+f_{13}S1+(1-f_{13})S3+f_{14}S1+(1-f_{14})S4]/3$$

$$S2'=[f_{12}S2+(1-f_{12})S1+f_{23}S2+(1-f_{23})S3+f_{24}S2+(1-f_{24})S4]/3$$

$$S3'=[f_{13}S3+(1-f_{13})S1+f_{23}S3+(1-f_{23})S2+f_{34}S3+(1-f_{34})S4]/3$$

$$S4'=[f_{14}S4+(1-f_{14})S1+f_{24}S4+(1-f_{24})S2+f_{34}S4+(1-f_{34})S3]/3$$

Note that $$S1'+S2'+S3'+S4'=S1+S2+S3+S4$$

Thus, no sample energy is lost and the Erdahl Criterion is satisfied. Further, the sample set with the greatest contrast difference will have a lower blend factor, thus more aggressive filtering.

A consideration in the choice of blend factors is that if blend factors are arranged so the fraction of a sample contributed to another pixel is greater than the fraction contributed to the pixel in which the sample resides, a halo effect may be created around high contrast objects or edges. For example, if $f_{12}$, $f_{13}$, and $f_{14}$ were all 0, S1' and the pixel in which it resides would receive no contribution from S1, but rather, all of the energy from S1 would be distributed to the neighboring samples, S2, S3, and S4, and thus to neighboring pixels. This halo effect may be useful to create some special effects, however to achieve the goal of reduced aliasing and artifacts, it should generally be avoided.

For the set of samples shown in FIG. 9, S=4 or there are four samples. To avoid halos, each of the blend factors, $f_{xx}$ can be greater than or equal to ½. This insures that the pixel in which a given sample resides receives at least one quarter of the energy from that sample, and that none of the adjacent pixels receives more than one quarter of the energy of the given sample.

There are several useful special cases which simplify the required computations. One is selecting a single blend factor based on the maximum and minimum pixel intensities of the 4 samples. A further simplification is to use a simple 2-step function for the single blend factor. The example in which all 4 samples are evaluated together is this special case of the general situation. The simplified case is equivalent to selecting a single blend factor based on the contrast value of the samples with the highest and lowest intensities:

$f_{12}=f_{13}=f_{14}=f_{23}=f_{24}=f_{34}=(0.5$ if the contrast is above the threshold, or 1 if the contrast is not above the threshold)

Figure 13:
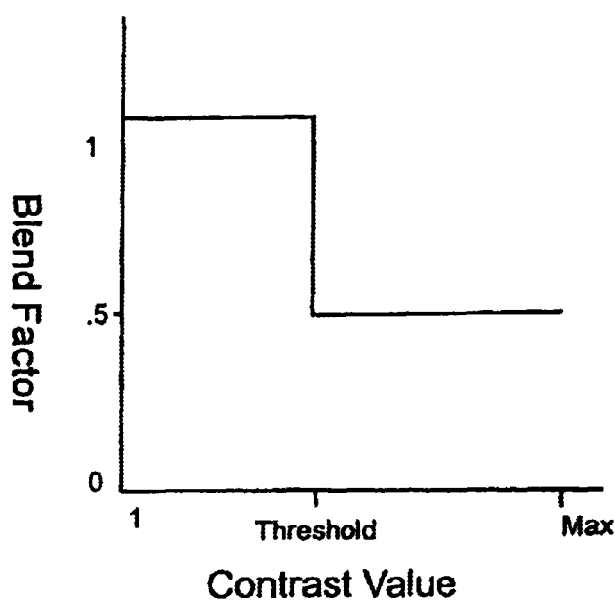
FIG. 13 illustrates a two step blend function.

This function is shown in FIG. 13.

The pre-determined contrast threshold value can be a fixed value or a user-defined variable. The exact value depends on a number of factors such as the display system used, and the desired degree of sharpness vs. aversion to artifacts, etc. One threshold value that has been used is a contrast ratio of 2.0 (contrast index of 0.5) and this value appears to produce satisfactory filtering results.

The auto-adjusting filter has been configured to reduce sampling artifacts when a graphics system is using point supersampling antialiasing. The antialiasing of this invention is performed without reducing or "washing out" texture resolution, which is usually an undesired side effect of filtering and post-filtering techniques. This is in significant contrast to prior art filtering techniques which tend to blur texture and detail resolution.

In addition, it is possible to increase texture detail without introducing artifacts because the auto-adjusting filter can eliminate a large number of artifacts that frequently result from less aggressive texture filtering. In high-quality image systems, texture is usually filtered at least twice in addition to any filtering done in the frame buffer. The source texture maps themselves are filtered when they are created, reducing detail, and the texture is also filtered when it is applied to primitives during the rendering process. This is done to reduce sampling artifacts, with the side effect, as explained previously, that some detail is lost through each filter. Often, minimization of distracting artifacts is paramount, leading to considerable loss of detail in the texture. The application of the auto-adjusting filter to frame buffer samples greatly reduces the need for aggressive filtering of the texture. This is because texture areas subject to artifacts will be more aggressively filtered by the auto-adjusting filter, and this reduces artifacts in the final image. Therefore, the filtering of texture can be less aggressive and this increases the detail in the texture, while artifacts that would otherwise occur are handled by the auto-adjusting filter. In addition, the auto-adjusting filter technique may be also be used in the two steps of texture filtering to further reduce artifacts and preserve detail.

Because each pass in the multi-pass filter uses filter regions that are offset from other passes, a natural transition band is formed between pixels with the larger and the smaller filter kernels making the boundary visually unobtrusive. FIG. 14 shows an example of a region of the frame buffer on which the auto adjusting filter is used. The boxes with solid lines indicate final pixel regions. The boxes with dotted lines indicate intermediate (four corners) filter regions. The shaded boxes indicate intermediate regions in which filtering occurs on the first pass. The numbers indicate the proportion of each pixel that is affected by the first pass filter. Note that the pixels with no effect (0) are necessarily separated from pixels with full effect (1) by a transition band of pixels with some partial effect. This is a natural result of the fact that the filter regions of each pass are spatially offset. Additionally, intermediate regions in which the filtering occurs contain a relatively low contrast color transition, making any filter transition in the area even less perceptible.

Figure 15:
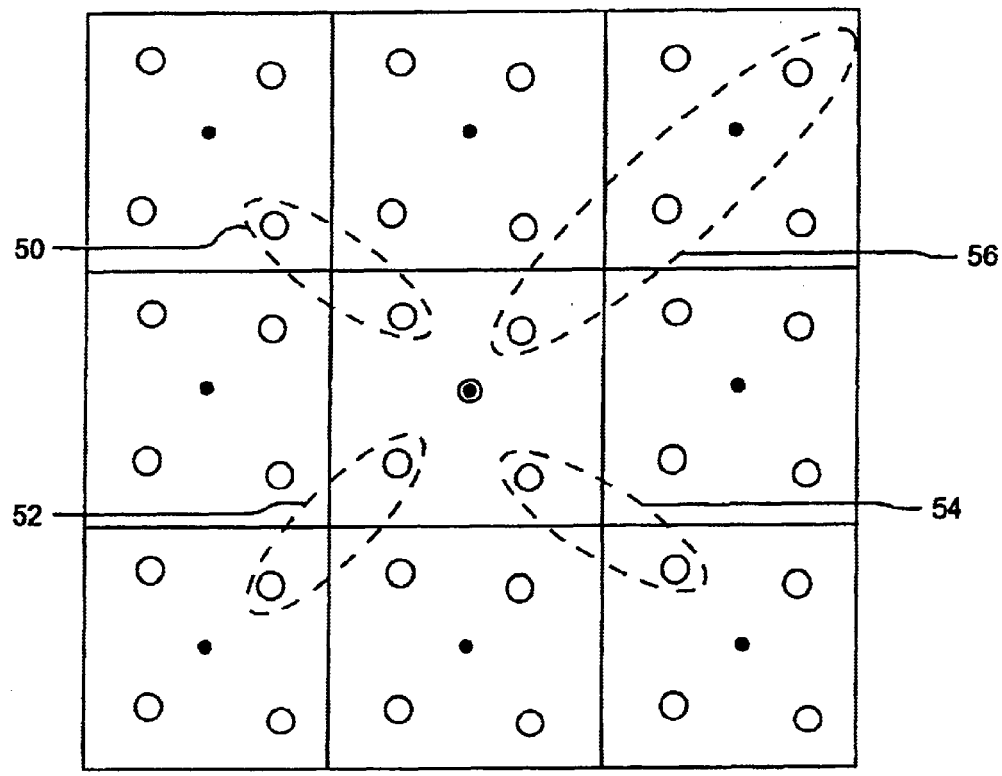
FIG. 15 depicts a pixel filter where two or more samples from each corner will be blended.

FIG. 15 depicts a filter where two samples from each corner of the pixel of interest will be blended. This can be considered a two corners region. If the contrast between the two samples in the two corners region 50 exceeds the pre-determined contrast threshold then these two samples will be averaged together and replaced with the average. The figure also shows three other regions at each of the corners 52, 54, 56. The region at the upper right corner 56 also shows that the region can be extended from just two samples to three or more samples that are not necessarily directly adjacent to the corner.

Figure 16:
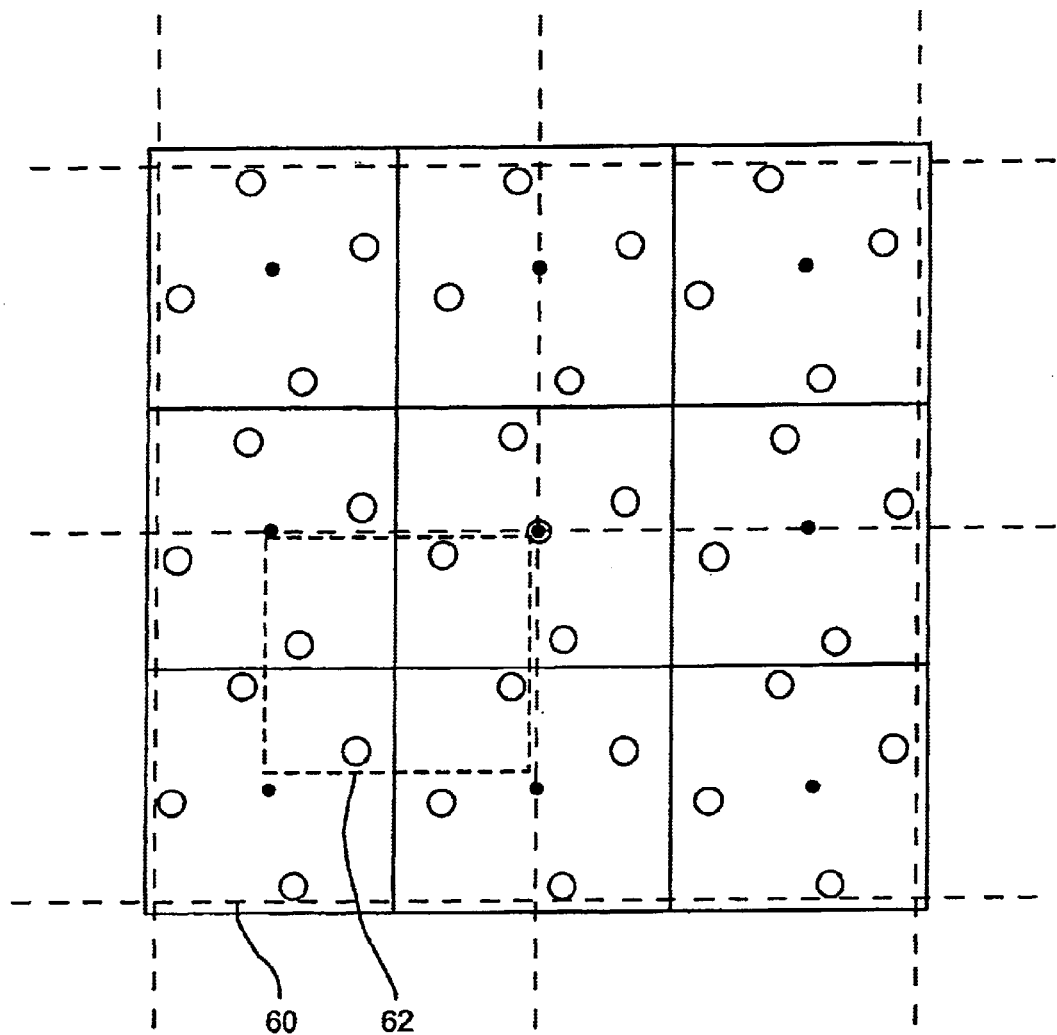
FIG. 16 is an auto-adjusting filter where the four corners region of the pixel is selectively expanded.

FIG. 16 is an auto-adjusting filter where the four corners regions of the pixel are expanded as compared to the test region. In this case, the contrast test region 62, which includes just the four samples as shown in FIGS. 6–8, has already been tested for contrast and a contrast threshold level has been exceeded. The result in this case is that not only is averaging performed, but the size of the four corner's region 60 and the number of samples that are averaged is much larger than the area tested for contrast. This creates a more aggressive filter where the contrast is high but provides a computationally small test area.

Figure 17:
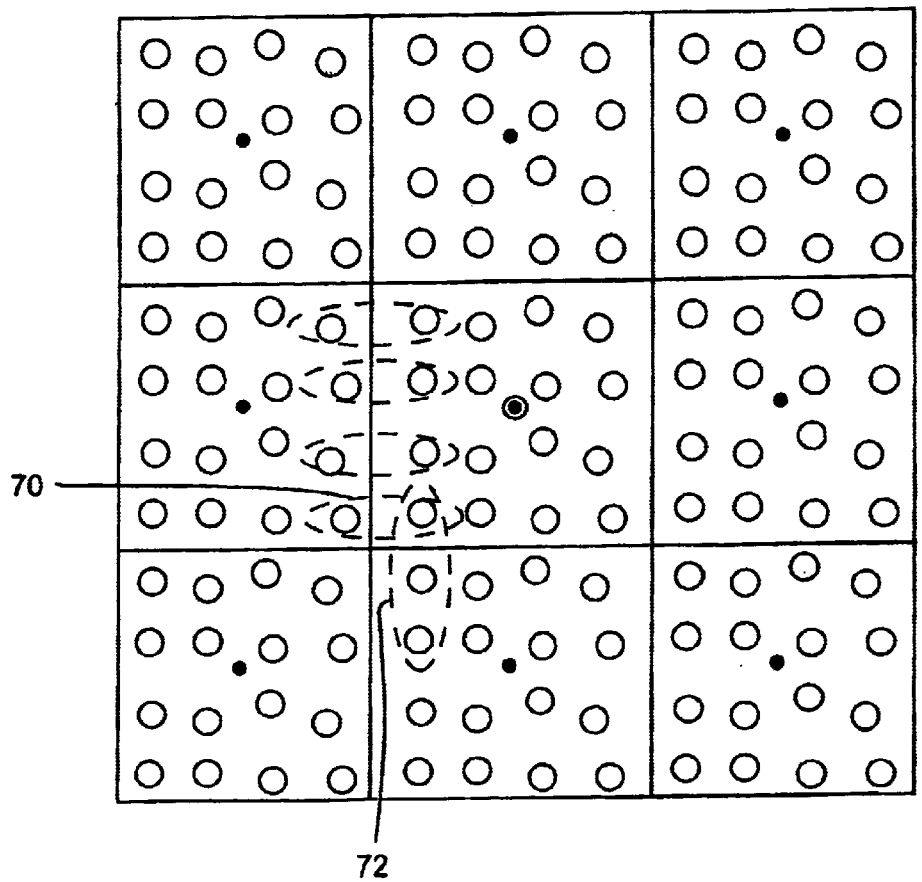
FIG. 17 illustrates an auto-adjusting filter with 16 samples per pixel and filtering regions based on contrast.

FIG. 17 illustrates an auto-adjusting filter with 16 samples per pixel and filtering regions based on contrast. This shows a possible organization for pixels with 16 samples per pixel. In this embodiment a filter region can have two samples 70 that are tested for contrast and then averaged if the contrast exceeds the pre-determined contrast level. The region 72 shows that a region with three or more samples can also be created. In this situation, only two of the samples might be compared for contrast. For example, the sample in the pixel of interest and the adjacent pixel may be compared and then three or more samples would be averaged together. It can also be imagined that region 70 and 72 could be combined into one single region with two "fingers". This illustrates that the regions where contrast is tested and where the averaging takes place need not necessarily by symmetric as long as the Erdahl criterion is met. This means that the final weightings can take into account the filter size and shapes when the samples inside the pixel of interest are averaged together to create the final pixel value.

Figure 18:
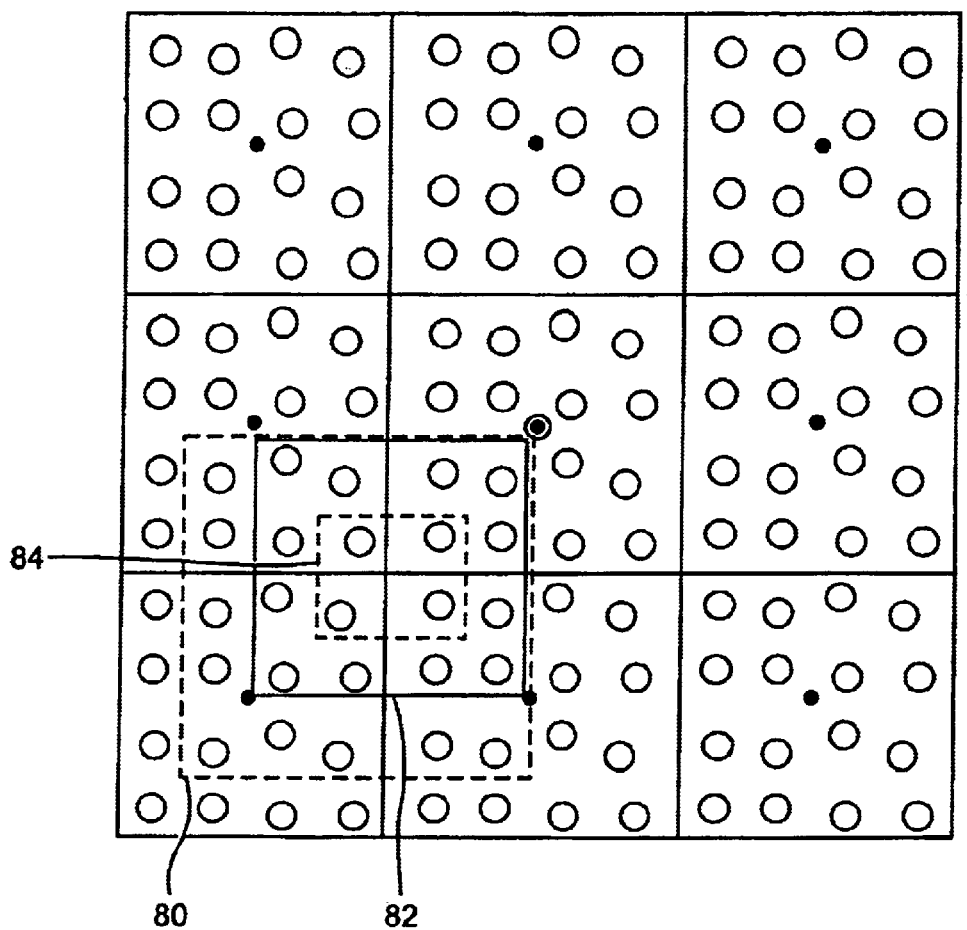
FIG. 18 illustrates an auto-adjusting filter with a four corner region that is selectively expanded or reduced in size.

FIG. 18 illustrates an auto-adjusting filter with a four corners region that is selectively expanded or reduced in size. The area to be tested will generally be smaller than the final effective filter but as long a two samples are selected within the test region this will be sufficient for the auto-adjusting filter to operate. Once the contrast value for a region has been determined, then the size of the averaging filter can be selected. If the contrast is high, then the larger filter can be selected 80 and the samples will be averaged and replaced with the average value. If the contrast is medium, the filter with a medium amount of averaging 82 will be selected. In the situation where a low level of contrast exists, then the smaller filter size will be selected 84. A variation of this embodiment can use the smallest area for testing and then select the appropriate sized filter region.

An important consideration must be made in order to keep the embodiment in FIG. 18 in line with the Erdahl criterion. The filter will dynamically compute the sample weightings for the final averaging within the pixel of interest. For example, if the four corners region uses an aggressive region size then the amount of weighting that is given to the sample(s) in the pixel of interest can be lower when the samples are averaged into the final pixel color.

Figure 19:
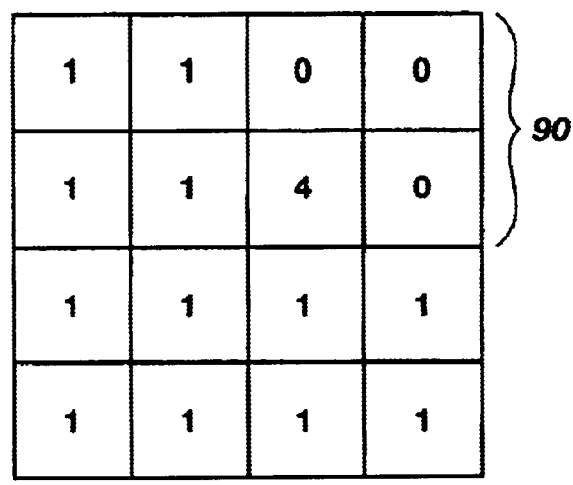
FIG. 19 illustrates a 4×4 sample filter where the upper right hand corner has lower contrast.
Figure 20:
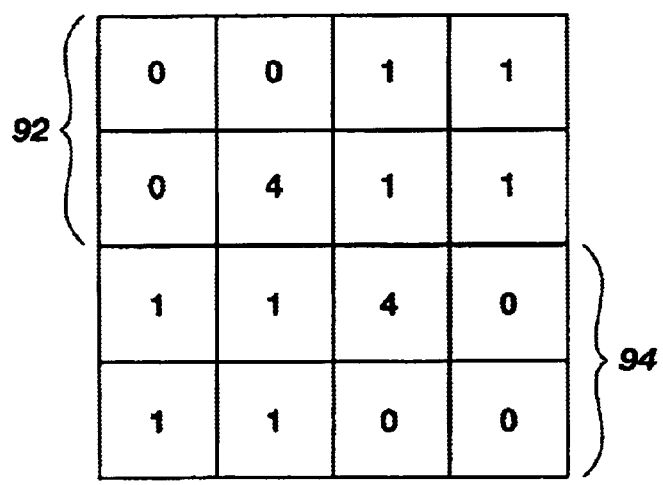
FIG. 20 illustrates a 4×4 sample filter where the upper left hand corner and lower right hand corners have lower contrast.

FIG. 19 illustrates the weighting of a filter kernel where the upper right hand corner 92 of a set of samples has a lower contrast and is not filtered. Since this quadrant is not filtered, the sample within the pixel of interest is weighted 4 times heavier. This allows each area to make an equal contribution. FIG. 20 illustrates a filter kernel where the upper left hand corner 92 and the lower right hand corner 94 are not filtered due to a lower contrast. Again, the samples within the pixel of interest that were not filtered in the four corners filtering step are weighted at 4 times the weight of samples that are filtered.

There are several advantages to using an auto-adjusting filter on a digital image. One advantage is the auto-adjusting filter retains wider and flatter filter properties in higher contrast areas. This smoothes the high contrast edges and reduces artifacts without suffering a wholesale loss of detail. Since the filter kernel is chosen based on contrast, low contrast areas can apply a smaller more peaked filter. Furthermore, the wide filtering is selectively applied to those areas that are subject to artifacts while generally avoiding areas that are less prone to artifacts and aliasing.

In the more dynamic case, a continuously variable filter kernel is calculated based on the contrast between neighboring samples. For example, the filter may have tens or hundreds of kernel configurations as opposed to just two or eight configurations. In a more continuous type of system, multiple contrast threshold values can be referenced and different filter kernels can be used depending on where the sampled contrast is located on a contrast scale.

A valuable approximation of the continuously variable filter can be achieved by aggressively filtering samples with contrast values above a programmable threshold. This comparison reduces potential artifacts above the threshold while areas with pixel-to-pixel contrast below the threshold are unchanged by the filter. For example, this preserves detail on textured polygons where the texture filtering process may have already eliminated artifacts.

One prior art filter has created a flicker reduction filter to reduce the flicker in interlaced television images converted from non-interlaced computer graphics data. This is done by using a regular grid pattern with adjustable weightings. The weighting pattern in U.S. Pat. No. 6,094,226 to Ke et al. is selected using pattern recognition and pixels are always included in the filter with a lesser or greater weighting. In essence, the filter thickens lines and characters in the vertical direction and uses a fixed antialiasing filter in the horizontal direction. This is suitable for converting progressive scan images to interlaced images, but the adaptive filtering used is based on pattern recognition and adding extra brightness value to the image. This type of filter does not meet the Erdahl criterion. In other words, individual pixels may have a greater or lesser degree of contribution to the overall picture and expanded lines depending on the combination of filter weights chosen. Consequently, this can lead to artifacts in moving simulated scenery generated in the applications targeted by the current invention. The task of producing an antialiased graphics image from a set of supersamples, which may or may not be in a regular grid pattern, is a fundamentally different process than converting computer graphics to interlaced television images.

Some of the filtering embodiments illustrated in this description also have the advantage of computational simplicity while achieving an approximation of a continuous filter. This computational simplicity is due in part to the simplified methods for calculating the contrast indices and/or contrast ratios, and the use of a smaller test area as compared to the filter area. In other words, an intelligent selection of one of several appropriate filters can be implemented with a relatively small amount of logic or computation time. This type of filter selection also tends to produce superior results over any single, uniformly applied filter.

Computational simplicity is also illustrated in the use of smaller sets of samples that are evaluated by the contrast function, even though a larger number of samples may contribute to the color of a resulting pixel. For example, a simple embodiment of the invention creates a contrast value from just two of the samples in a test region. Another example is that the testing may operate on only 4 samples at a time, but 8 or 16 samples can contribute to the final pixel. This saves storage space by requiring fewer line buffers and logic in the testing step by reducing the number of comparisons that must be performed simultaneously.

An additional advantage is that this invention does not require primitive sorting. It can also be used without modifications to the rendering processor if the filtering is done after the frame buffer or as part of texture filtering.

An important property of this technique is that it meets the Erdahl equal energy criterion. Each sample makes the same overall energy contribution to the picture no matter which of the filter kernels or combinations is applied to a given region.

Figure 21:
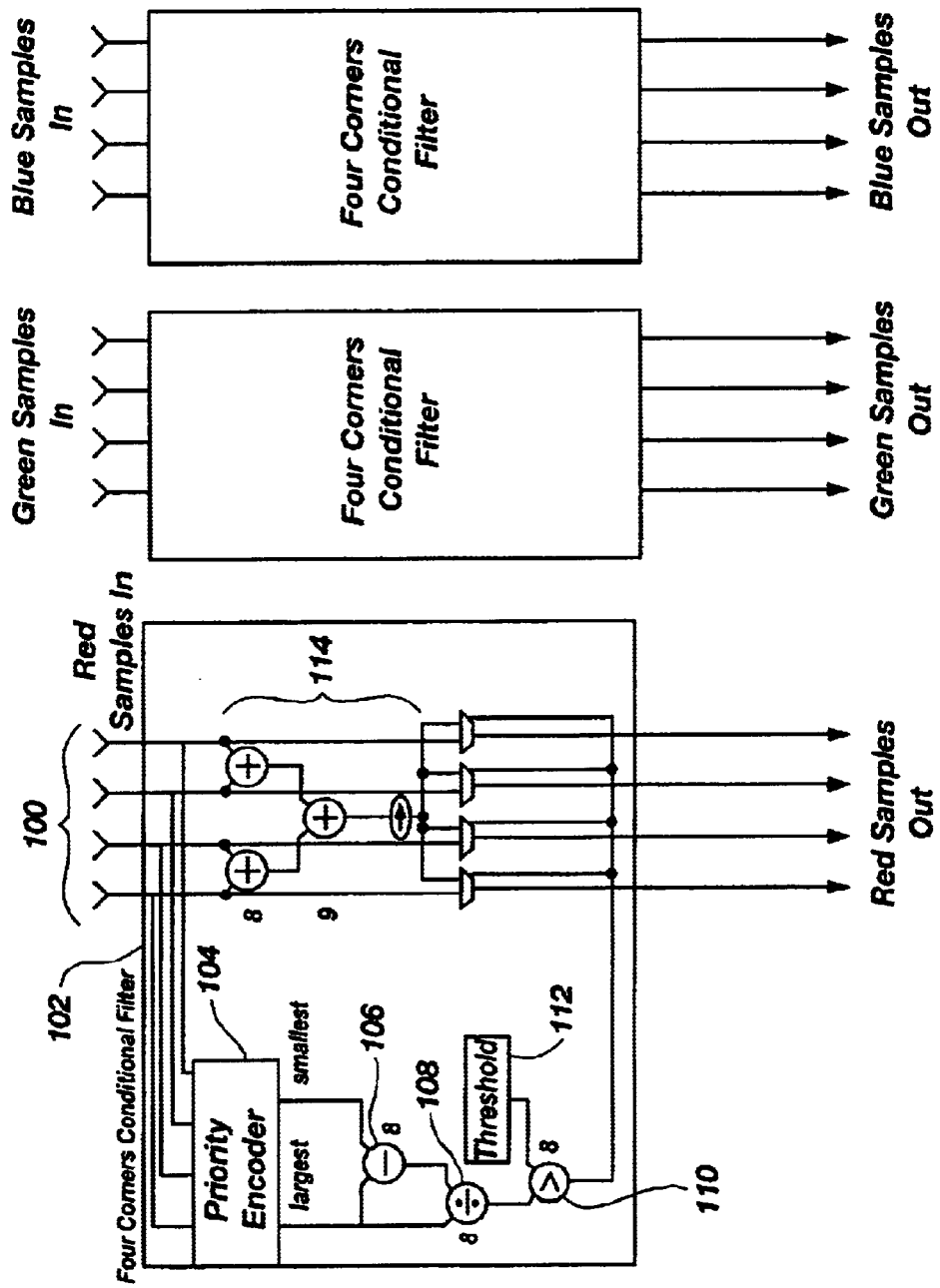
FIG. 21 is a schematic diagram of a four corners conditional filter.

This system and method is also efficient in terms of the amount of logic required for a hardware implementation. A schematic diagram of a conditional filter implemented in hardware for the four corners region is shown in FIG. 21. The auto-adjusting filter may be implemented as part of frame buffer scanning with the use of line buffers to store two lines worth of samples. Four samples are received as input 100 by the four corners conditional filter 102. The samples are read by the priority encoder 104. Next, the priority encoder selects the samples with largest and smallest brightness values and sends those values to a subtractor 106 and a dividing unit. Then the difference between the largest and smallest sample values is divided by the largest sample value to create a contrast index or value. The contrast index for the four corners region is then compared 110 to a pre-determined contrast threshold value 112. If the current contrast index meets or exceeds the contrast threshold value then the averaged sample values will be enabled and copied into the pixel buffer. The averaged sample values are created by adding the samples and dividing by four 114 (i.e., shifting by 2).

Figure 22:
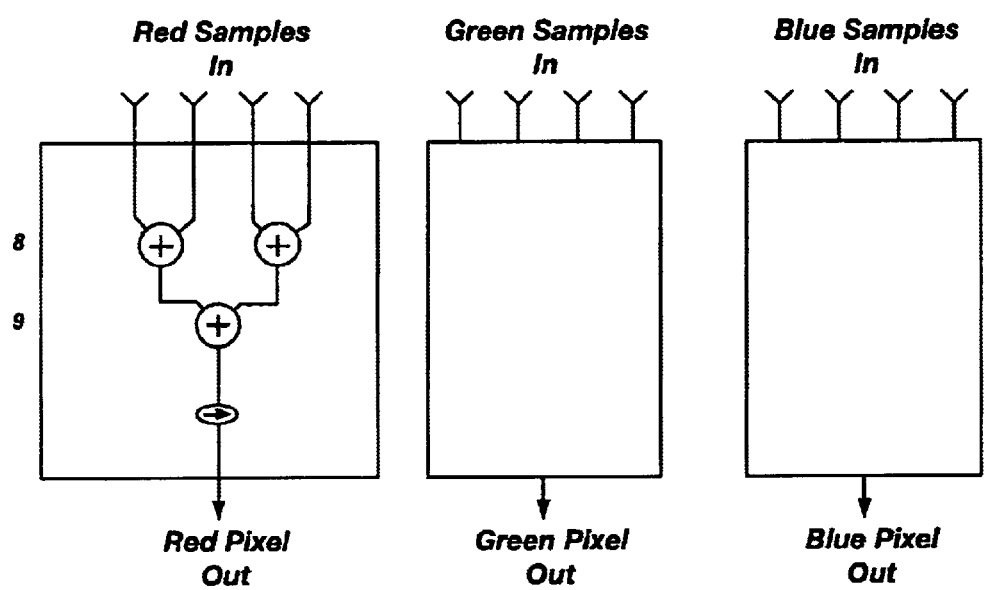
FIG. 22 is a schematic diagram of a one pixel flat-top filter that would be used after FIG. 21 has been applied.

The final stage of filtering is the 1-pixel flat-top filter applied to the four samples in each pixel area. This averaging of the pixels samples to get the final pixel value is shown in FIG. 22. Two of the possible filter kernel shapes that result from the convolution of these two filtering operations are the 2-pixel area flat filters as shown in FIGS. 19 and 20. However, due to the adaptive nature of the filtering, the actual filter kernel applied to a given pixel may be some combination of the two filter circuits and may not necessarily be symmetrical.

Although the embodiment of the invention above is depicted as being implemented in hardware, this invention may be implemented in software. The filter can additionally be applied to an image stored in RAM or when it is stored in the frame buffer. The circuitry illustrated above can also be written into a field programmable gate array (FPGA) and used as part of the video output circuitry.

In conclusion, the simplified filter of the detailed embodiment, the continuously variable filter, and other versions of the adaptive post filter improve edge quality, reduce jagged edges and largely maintain texture detail. This provides a smoother and cleaner looking image for the end viewer and also reduces the blurring and washing out of image details.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A method for antialiasing a computer graphics image using filtering, the method comprising the steps of:
   defining a plurality of regions having samples from pixels in the computer graphics image, where the regions are associated with a pixel of interest and adjacent pixels to form an antialiasing filter;
   determining a contrast for each region; and
   blending the regions that form the filter based on the contrast for each region by excluding regions from the filter that do not exceed a pre-determined contrast level.

2. A method as in claim 1, wherein the step of defining a plurality of regions further includes the step of including samples from the pixel of interest and adjacent pixels in each of the regions.

3. A method as in claim 1, wherein the step of blending the regions further comprises the step of adjusting the weighting of the samples in each region based on the region's contrast.

4. A method as in claim 3, wherein the step of weighting samples based on the region's contrast further comprises the step of weighting samples farther from a center of the pixel of interest with an increased weight when the contrast exceeds a pre-determined threshold.

5. A method as in claim 3, wherein the step of weighting samples based on contrast further comprises the step of weighting samples farther from the pixel of interest with a lesser weight when the contrast does not exceed a pre-determnined threshold.

6. A method as in claim 1, wherein the step of blending the regions that form the filter further includes the step of blending the regions which form the filter by increasing region size for regions when the contrast equals or exceeds a pre-determined contrast.

7. A method as in claim 6, wherein the step of increasing region size further includes the step of increasing the number of samples included in the region.

8. A method as in claim 1, wherein the step of blending the regions further includes the step of blending the regions that form the filter by decreasing a region size for regions where the contrast falls below a pre-determined contrast level.

9. A method as in claim 8, wherein the step of decreasing region size further includes the step of decreasing the number of samples included in the region.

10. A method as in claim 1, wherein the step of determining a contrast further comprises the step of determining the contrast by subtracting the sample with the minimum brightness from the sample with the maximum brightness to create a brightness difference.

11. A method as in claim 1, wherein the step of determining the contrast further comprises the step of dividing the sample with the maximum brightness by the sample with the minimum brightness.

12. A method as in claim 1, wherein the step of determining the contrast further comprises the step of dividing the difference between the sample with the maximum brightness and the sample with the minimum brightness by the sample with the maximum brightness.

13. A method for filtering a digital image, comprising the steps of:
defining a plurality of spatial regions that are associated with a pixel of interest, and each spatial region includes samples from adjacent pixels and samples from the pixel of interest;
comparing the intensities of samples in the spatial regions to create a contrast value for each region;
averaging the samples of each spatial region that exceed a pre-defined contrast value; and
replacing the samples of each spatial region that exceed a pre-defined contrast value with the average of the samples.

14. A method as in claim 13, further comprising the step of filtering all the samples in the pixel of interest to create a pixel value.

15. A method as in claim 14, wherein the step of filtering all the samples in the pixel of interest further comprises the step of filtering all the samples in the pixel of interest by averaging the samples to create the pixel value.

16. A method as in claim 13, wherein the step of comparing the intensity of samples further comprises the step of dividing a maximum intensity sample in a region by a minimum intensity sample to produce a contrast ratio.

17. A method as in claim 13, wherein the step of comparing the intensity of samples, further comprises the step of dividing difference between the sample with the maximum brightness and the sample with the minimum brightness by the sample with the maximum brightness to produce a contrast index.

18. A method as in claim 13, wherein in the steps of averaging the samples and replacing the samples of each spatial region with an average of the samples, further comprises the step of averaging the samples and replacing the samples with the average of the samples when the contrast index exceeds 0.5 or the contrast ratio exceeds 2.0.

19. A method for antialiasing computer generated graphic images using a post filter, comprising the steps of:
selecting a pixel of interest;
defining a four corners region associated with a corner of the pixel of interest, and the four corners region includes at least one sample from the pixel of interest and pixels adjacent to the four corners region;
identifying the maximum and minimum intensity sample values in the four corners region;
dividing the maximum intensity sample value by the difference between the maximum and minimum intensity sample values to obtain a contrast ratio;
comparing the contrast ratio to a contrast threshold value;
replacing each sample in the four corners region with the average of the samples in the four corners region when the contrast ratio meets or exceeds the contrast threshold value.

20. A method as in claim 19, further comprising the step of averaging the samples in the pixel of interest to produce a pixel value after the processing on the four corners region has been completed.

21. A method as in claim 19, further comprising the step of repeating the steps above for each of four corners of the pixel of interest.

22. A method as in claim 19, further comprising the step of including at least one sample from each pixel that is adjacent to the corner of the pixel of interest.

23. A method as in claim 22, further comprising the step of including 4 samples in the four corners region where each sample is from a different pixel and one of the samples is from the pixel of interest.

24. A method for filtering a digital image, comprising the steps of:
defining a plurality of spatial regions that are associated with a pixel of interest and each spatial region includes regions from adjacent pixels and the pixel of interest;
comparing the intensity of samples in the spatial regions to create a contrast value;
changing the size of spatial regions based on comparing the contrast value to a pre-defined contrast threshold level;
averaging the samples of each spatial region; and
replacing the samples of each spatial region with average of the samples.

25. A method as in claim 24, wherein the step of changing the size of the spatial regions further includes the step of increasing the size of the spatial regions when the contrast value meets or exceeds the contrast threshold level.

26. A method as in claim 25, wherein the step of increasing the size of the spatial regions further includes the step of increasing the number of samples that are included in the spatial region.

27. A method as in claim 24, wherein the step of changing the size of the spatial regions further includes the step of decreasing the size of the spatial regions when the contrast value is less than the contrast threshold level.

28. A method as in claim 27, wherein the step of decreasing the size of the spatial regions further includes the step of increasing the number of samples that are included in the spatial region.

29. A device for filtering a digital image, comprising:
a pixel buffer to store pixels and associated samples;
a priority encoder, coupled to the pixel buffer, to receive samples for a specific region associated with a pixel and to select samples with the maximum and minimum brightness;
a subtractor coupled to the priority encoder, to subtract the sample with the minimum brightness from the sample with a maximum brightness to create a brightness difference; and
a dividing module associated with the subtractor, to divide the brightness difference by the maximum brightness to create a contrast index;
a comparator coupled to the dividing module to compare the contrast index with a pre-selected contrast index; and
an averaging module to average the samples in a region if the contrast index exceeds the pre-selected contrast index.

30. A device as in claim 29, further comprising a write means to write the average of the samples in a region into each of the samples in the region.

* * * * *